Figure 1:
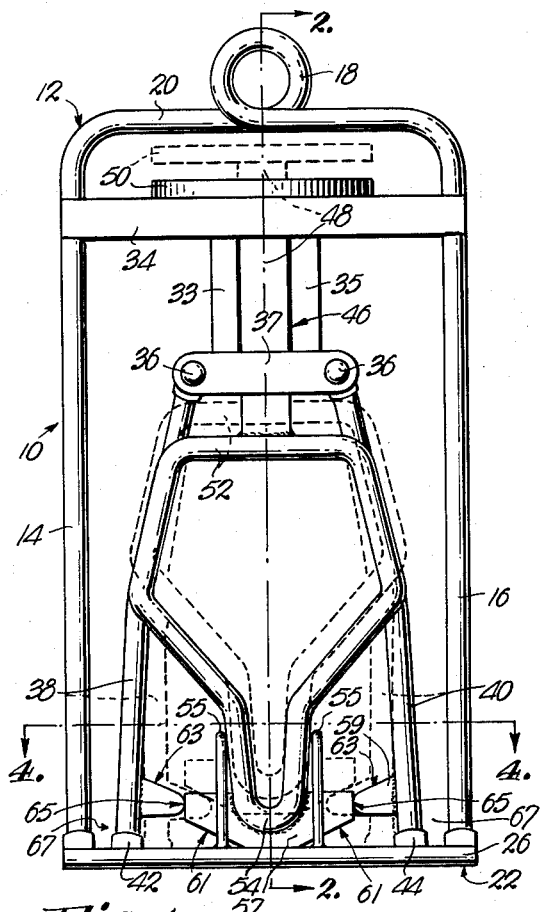

April 26, 1966 J. A. BONUCHI ET AL 3,247,543

AUTOMATIC SHACKLE

Filed Oct. 28, 1963                                                           3 Sheets-Sheet 1

James A. Bonuchi
Robert D. Crawford
John E. Franta
Henry E. Frederick
Ralph S. Zebarth
       INVENTORS.

BY

Hovey, Schmidt, Johnson & Hovey
                ATTORNEYS.

April 26, 1966  J. A. BONUCHI ETAL  3,247,543
AUTOMATIC SHACKLE
Filed Oct. 28, 1963  3 Sheets-Sheet 2

James A. Bonuchi
Robert D. Crawford
John E. Franta
Henry E. Frederick
Ralph S. Zebarth
INVENTORS.

BY

ATTORNEYS.

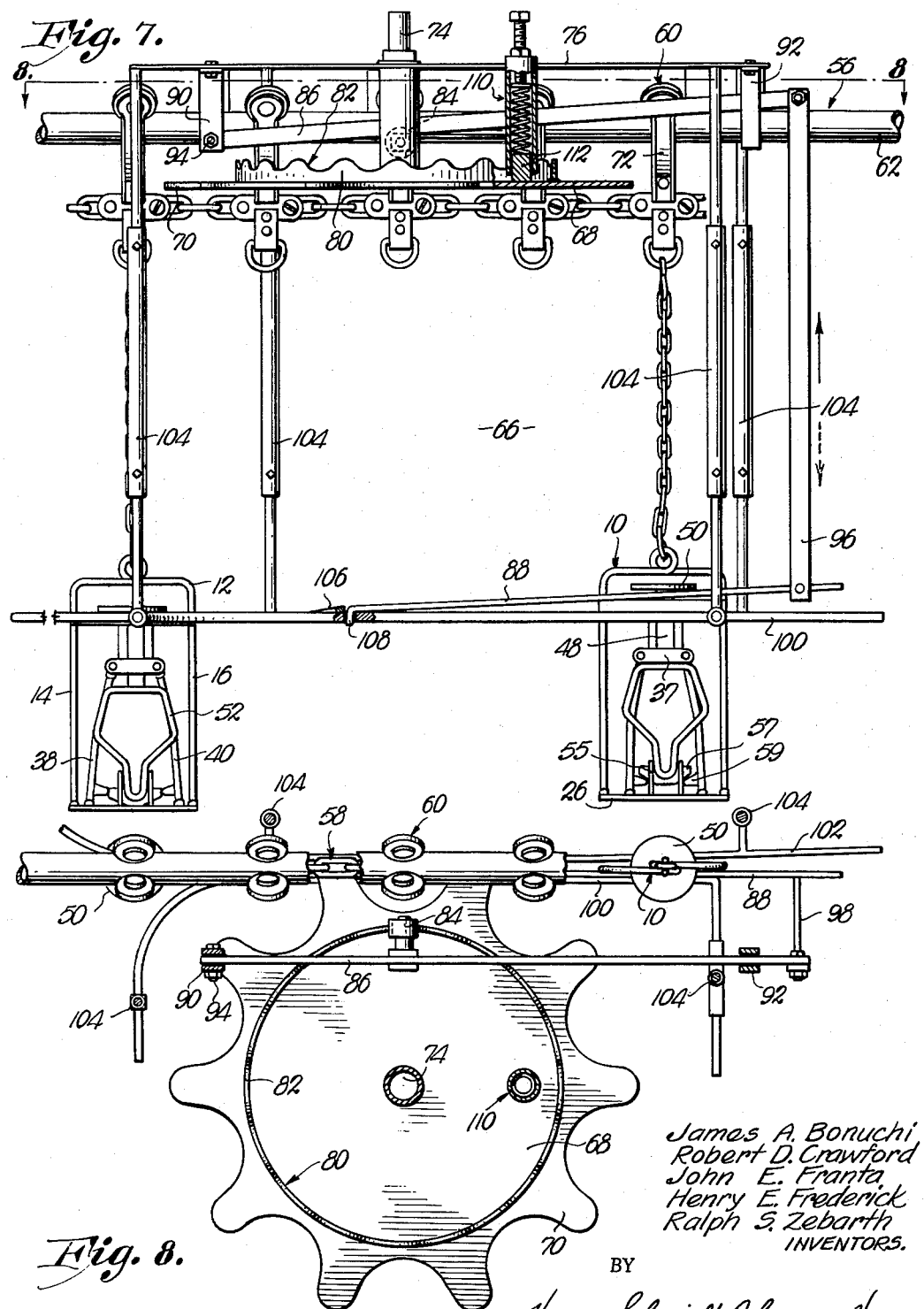

United States Patent Office 3,247,543
Patented Apr. 26, 1966

3,247,543
AUTOMATIC SHACKLE
James A. Bonuchi, Merriam, Kans., and Robert D. Crawford, Parkville, and John E. Franta, Henry E. Frederick, and Ralph S. Zebarth, Kansas City, Mo., assignors to Gordon Johnson Company, Kansas City, Mo., a corporation of Missouri
Filed Oct. 28, 1963, Ser. No. 319,296
11 Claims. (Cl. 17—44.1)

This invention relates to equipment used in the processing of poultry. More particularly, it has to do with the suspension, conveyance and release of birds in processing plants through use of overhead conveyors and shackles suspended therefrom.

Considerable manual labor is normally required in poultry processing plants along the many lines of suspended birds in placing the carcasses on the shackles and removing the same therefrom. Many suggestions have been made for permitting the elimination of some of such workers by rendering this phase of the operation at least semi-automatic. But, for the most part, the ideas heretofore conceived for automatic release have not been practical or efficient, and those which have been placed in operation are by no means trouble-free or inexpensive to produce, install and maintain.

The most important object of the instant invention, therefore, is to provide a unitary system for handling poultry through use of a conveyor-shackle unit that assures automatic release of the birds from their shackles in rapid succession and in timed relation to continued advancement of the conveyor, for gravitation of the released fowl at any desired location in the plant and during any desired stage of processing.

Another object of the present invention is to provide a system that requires no operator attention because of the fact that the shackles always return automatically to the bird-receiving condition after release while the releasing apparatus operates constantly to trip all shackles regardless of the nature of the spacing along the conveyor. As a result, such apparatus may be coupled with and work in timed relation to the conveyor so as to eliminate speed as a factor to be considered in assuring unrestricted movement of the shackles. Also, the inherent weight of the bird itself supplies, to a large extent, the means for assuring satisfactory operation.

Still another object of this invention is the provision of equipment of the aforementioned character that can be inexpensively produced and installed, requires little attention or maintenance, and is virtually foolproof in continuous operation day after day.

Yet another object of the present invention is the provision of a shackle forming a part of the system which is provided with novel lock means cooperating with a pair of relatively shiftable, notch-forming members to normally close the notch so that the legs of a bird received within the notches will be positively retained therein until the members are spread apart to permit the bird to gravitate from the shackle.

Figure 2:
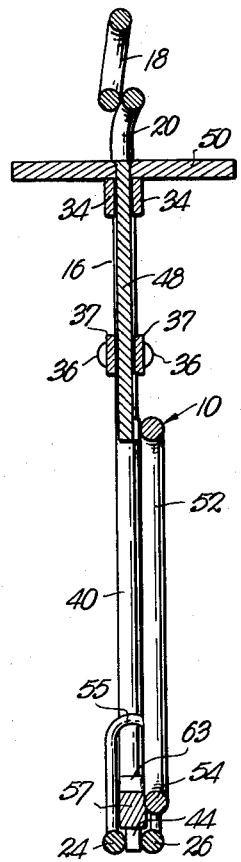
Figure 3:
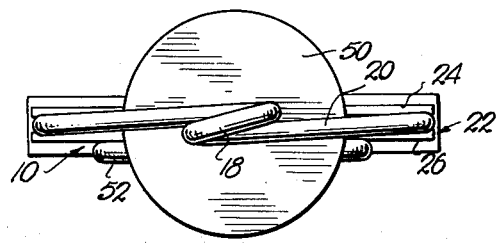
Figure 4:
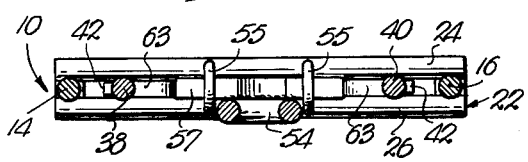
Figure 5:
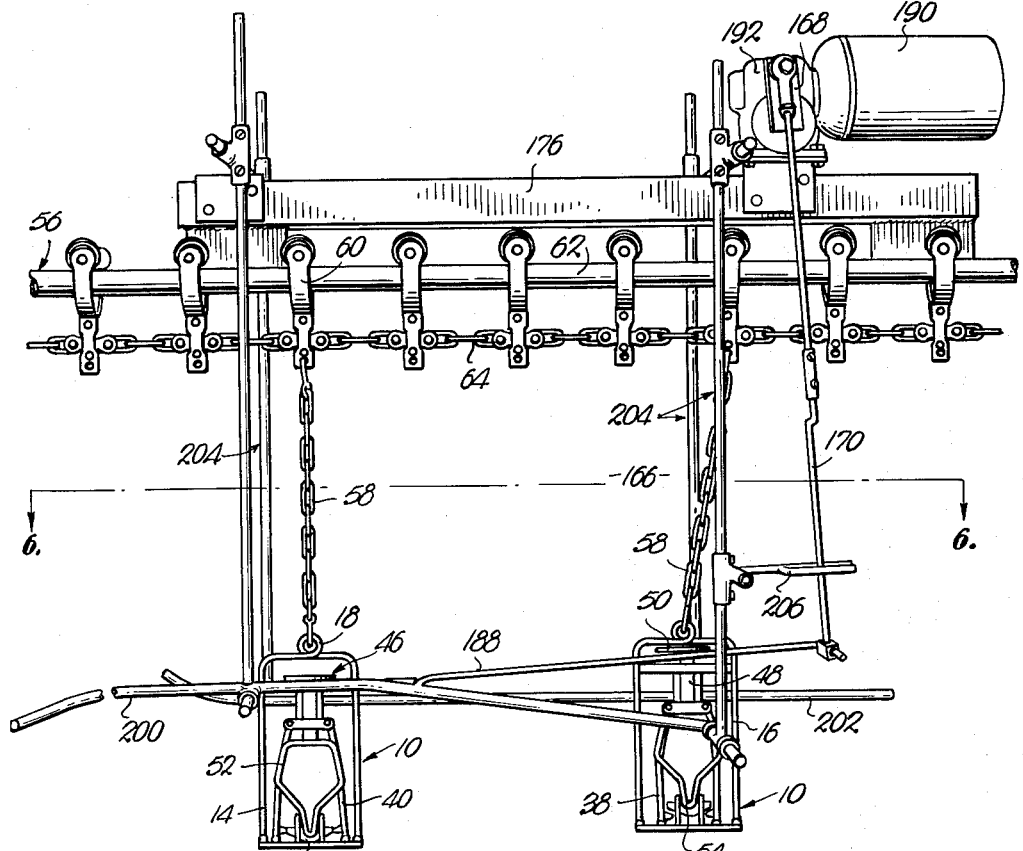
Figure 6:
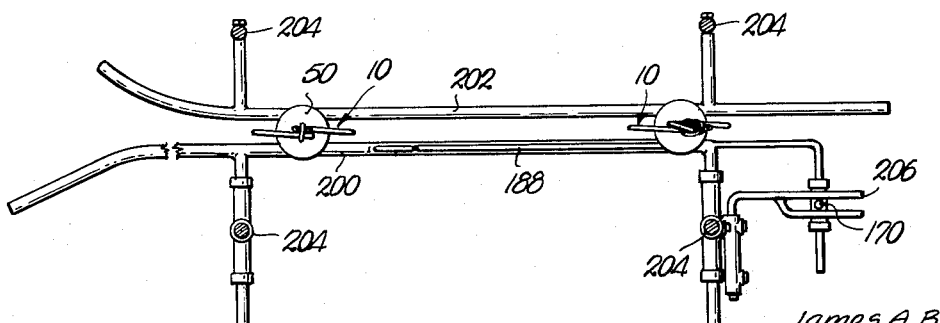

In the drawings:
FIGURE 1 is an elevational view of the shackle;
FIG. 2 is a cross-sectional view taken on line 2—2 of FIG. 1;
FIG. 3 is a top plan view of the shackle;
FIG. 4 is a cross-sectional view taken on line 4—4 of FIG. 1;
FIG. 5 is a fragmentary, side elevational view showing a pair of said shackles suspended from a conveyor, together with one form of our novel bird release or shackle tripping apparatus;
FIG. 6 is a fragmentary, cross-sectional view taken along line 6—6 of FIG. 5;
FIG. 7 is a fragmentary, side elevational view similar to FIG. 5 showing another form of bird release or shackle tripping apparatus; and
FIG. 8 is a fragmentary, cross-sectional view taken along line 8—8 of FIG. 7.

Shackle 10 includes a support in the nature of a continuous frame 12 having a pair of uprights or rigid elements 14 and 16 forming its sides, a top 20 and a bottom 22. A suspension eye 18 is formed in the top 20, and the bottom 22 takes the form of a pair of spaced guide rods 24 and 26.

A pair of spaced crossbars 34 join the sides 14 and 16, and a pair of spaced cross straps 37 are secured to bars 34 by spaced guide bars 33 and 35. A pair of upright arms or holding elements 38 and 40 are suspended from the strap or mount 37 for swinging movement toward and away from sides 14 and 16 by pivot pins 36. The flattened, lower ends 42 and 44 of arms 38 and 40 slide freely between rods 24 and 26.

Releasable holing means for normally maintaining the arms 38 and 40 in the full-line positions of FIG. 1 includes an upright trip 46 capable of being shifted or reciprocated vertically. It includes a bar 48 guided between bars 34—34, 33—35, and straps 37—37, and disposed between pivot pins 36. Bar 48 is provided with a tripping slide which, for purposes of illustration only, is in the form of a disc 50 rigid to the upper end of bar 48 and which normally rests on bars 34. Disc 50 is adapted to be raised and lowered and, as shown by dotted lines in FIG. 1, is in the raised position thereof. It is clear that the tripping slide may take other forms as well as being disc-shaped.

A neck holder 52, rigid to the lower end of bar 48, terminates at its lower end in a substantially U-shaped loop 54 adapted to receive the neck of a bird and suspend it by its head. A spacer 57, rigid to and projecting in opposed directions laterally from the lower end of loop 54, operates as a pusher to swing the arms 38 and 40 to the full line positions of FIG. 1, and as a lock to releasably hold arms 38 and 40 in such operable positions. A pair of notches 67 are formed between element 14 and arm 38 and between arm 40 and element 16, respectively, notches 67 being disposed for receiving the hocks of a bird to suspend the latter.

The flat, polygonal, vertical ends 65—65 of spacer 57 are abutted by the rounded ends of ears 59—59 on arms 38 and 40 adjacent the lower ends thereof. Ends 65—65 are of sufficient area to prevent any accidental tripping under the face of pressure of the ears 59 when the legs are in the notches 67. Ears 59 are placed as close to the lower ends of arms 38 and 40 as is practicable so that, when ears 59 are engaged by spacer 57, there will be no inward deflection of arms 38 and 40 due to their resilience to thereby prevent the enlargement of notches 67.

When disc 50 is raised to retract spacer 57 from between ears 59, inclined cam edges 63 of ears 59 slip beneath inclined cam edges 61 of spacer 57 under the force of the legs of the bird, causing arms 38 and 40 to swing to the dotted line positions shown in FIG. 1. This unlocking of arms 38 and 40 opens the notches 67—67, permitting the legs of the bird to slide off the round surfaces of rods 24 or 26 (depending on which side of shackle 10 the bird is hanging) as the bird gravitates from shackle 10.

When disc 50 is dropped, edges 61, camming against edges 63, force arms 38 and 40 apart. Upstanding loop 55 on rods 24 and 26 embrace loop 54 and spacer 57 to guide such parts during their reciprocable movements. Because of the guides 37—37, 33—35 and 34—34 for bar 48, as well as the guides 37—37 and 24-26 for arms 38 and 40, and the guides 55—55 for spacer 57 and loop 54, there are no parts of shackle 10 which can easily become twisted or bent out of shape and into misalignment; hence the entire shackle 10 is capable of withstanding considerable abuse.

Eye 18 permits suspension of shackle 10 from an overhead conveyor 56 (FIG. 5) through use of chain 58 hanging from wheeled trolley 60. Conveyor 56 has a track 62 carrying the trolleys 60 that are in turn advanced when a pull is exerted on a chain 64 which interconnects the trolleys 60.

Apparatus 166 for operating trip 46 includes a crank 168 operably coupled with a lifting lever 188 by a link 170 pivotally coupled to one end of lever 188 and operated by an electric motor 190 through a gear reducer 192 to effect up-and-down swinging movement of lever 188 at predetermined timed intervals.

Shackle guides 200 and 202 are carried by hangers 204 suspended from a beam 176 mounted on track 62. Guide 200 pivotally receives one end of lever 188. Rod 170 is stabilized in its movement by a bifurcated guide 206 secured to one of the hangers 204, and the gear reducer 192 as well as motor 190 are carried by beam 176.

A modified apparatus 66 (FIGS. 7 and 8) for operating trip 46 is controlled by conveyor 56 and includes a disc 68 having peripheral teeth 70 that are successively engaged by stems 72 of trolleys 60. Disc 68 has an upstanding stub shaft 74 that is rotatably carried by a panel 76, the latter of which is supported by track 62.

An upstanding band 80 on disc 68 has an undulated, uppermost camming surface or edge 82 upon which a roller 84 of a bar 86 rests. Bar 86 constitutes part of the mechanism for operating an elongated, swingable lifting lever 88. Brackets 90 and 92 depend from the panel 76, the former receiving pivot pin 94 for bar 86, and the latter serving as a guide for bar 86. Edge 82 could be replaced by a crown gear and roller 84 could be replaced by a spur gear in meshing relationship with the crown gear, if such structure is desired. A link 96 pivotally interconnects bar 86 and a lateral finger 98 of lifter 88.

Shackle guides 100 and 102 are carried by panel 76 through extensible hangers 104. Guide 100 has a small ramp 106 adjacent lever 88, the latter being pivotally coupled with guide 100 by downturned ear 108 extending loosely into guide 100.

A brake or retarding means 110, carried by panel 76, has a spring-loaded brush 112 that bears against disc 68 to prevent overrun and assure its rotation only as actuated by trolleys 60.

*Operation*

During the time conveyor 56 advances the shackles 10 (left-to-right viewing FIGS. 5 and 7), the inherent weight of the trip 46 normally holds the arms 38 and 40 spread apart and adjacent corresponding sides 14 and 16 as seen in full lines in FIG. 1, presenting notches 67 for receiving carcass appendages such as hock or other parts of a bird. The legs are placed in the notches 67 and laid across bottom 22.

As trolleys 60 advance continually, intermittent rotation (clockwise, viewing FIG. 8) is imparted to disc 68 through teeth 70 from the stems 72 of trolleys 60. The spacing of trolleys 60 is such as to impart a virtually continuous rotative movement to disc 68 causing bar 86 and lever 88 to reciprocate vertically.

Shackle 10 moves between the guides 100 and 102 with disc 50 disposed thereover. Ultimately, disc 50 slides up ramp 106 and onto the lever 88, the latter of which commences to raise the trip 46 intermittently until the bird is released. A shackle 10 is shown at the right in FIG. 7 in the bird-releasing condition, the members 38 and 40 being retracted so that the bird drops in response to its own weight.

It is to be noted that lever 88 inclines upwardly from its pivot 108 to its outermost free end when lever 88 is at the upper end of its path of travel. When shackle 10 moves beyond lever 88, trip 46 drops automatically and the members 38 and 40 return to their leg-receiving position.

Constant striking of the disc 50 by lever 88 assures release of the birds with the aid of the vibration that, as a consequence, is imparted to the shackle. The birds cannot accidentally remain hanging from the shackle regardless of their sizes or weights, and regardless of the speed of the conveyor or the spacing between shackles.

In the operation of the form of shackle tripping apparatus shown in FIGS. 5 and 6, motor 190 operates at a speed calculated to cause lever 188 to swing to its uppermost position several times during the period it takes each shackle 10 to traverse lever 188. This raises disc 50 and releases the bird. Manifestly, the speed of motor 190 may be correlated with the speed of conveyor 56 to reciprocate lever 188 as often as is found necessary to effect proper releasing of the birds.

Shackle 10 provides an effective means for releasably holding the hocks of a bird and which does not rely upon springs or the like to return arms 38 and 40 to their locked positions after trip 46 has been actuated. By virtue of its construction, shackle 10 utilizes the force of gravity to return disc 50 and thereby arms 38 and 40 to the solid line positions thereof shown in FIG. 1.

Having thus described the invention, what is claimed as new and desired to be secured by Letters Patent is:

1. A poultry shackle comprising:
   a continuous frame having a pair of normally upright sides, a top and a bottom;
   a pair of arms extending upwardly from said bottom between the sides;
   a mount on said sides below said top pivotally supporting the upper ends of the arms for swinging movement of the lower ends of the arms toward and away from each other;
   an upright trip carried by said mount; and
   a spacer on the lower end of the trip between said lower ends of the arms normally holding the latter in positions adjacent corresponding sides for presenting a pair of notches above said bottom between the arms and the sides for receiving the legs of a bird to be suspended from the shackle, said trip being shiftable vertically with respect to the mount whereby, upon lifting of the trip, said spacer is pulled from between the arms for free swinging of the latter toward each other to release said legs from the notches in response to the weight of the bird and permit the latter to fall from the shackle.

2. The invention of claim 1, said bottom having parts for guiding said lower ends of the arms throughout the paths of swinging movement thereof.

3. The invention of claim 1, said bottom having means thereon for guiding the spacer throughout its path of up and down movement.

4. A poultry shackle comprising:
   a continuous frame having a pair of normally upright sides, a top and a bottom;
   a pair of arms extending upwardly from said bottom between the sides;
   a mount on said sides below said top pivotally supporting the upper ends of the arms for swinging movement of the lower ends of the arms toward and away from each other;
   an upright trip carried by said mount;
   a holder for the neck of a bird to be suspended from the shackle, said holder being secured to and depending from the trip; and
   a spacer on the lower end of the holder between said lower ends of the arms normally holding the latter in positions adjacent corresponding sides for presenting a pair of notches above said bottom between the arms and the sides for receiving the legs of said bird, said trip being shiftable vertically with respect to the mount whereby, upon lifting of the trip, said spacer is pulled from between the arms for free swinging of the latter toward each other to release said legs from the notches in response to the weight of the bird.

5. A poultry shackle comprising:
   a continuous frame having a pair of normally upright sides, a top and a bottom;
   a pair of arms extending upwardly from said bottom between the sides;
   a mount on said sides below said top pivotally supporting the upper ends of the arms for swinging movement of the lower ends of the arms toward and away from each other;
   an upright trip carried by said mount;
   a spacer on the lower end of the trip between said lower ends of the arms normally holding the latter in positions adjacent corresponding sides for presenting a pair of notches above said bottom between the arms and the sides for receiving the legs of a bird to be suspended from the shackle, said trip being shiftable vertically with respect to the mount whereby, upon lifting of the trip, said spacer is pulled from between the arms for free swinging of the latter toward each other to release said legs from the notches in response to the wight of the bird and permit the latter to fall from the shackle; and
   interengageable means on the arms and said spacer for camming the arms apart when the trip is dropped.

6. The invention of claim 5, said arms having ears extending toward each other and normally abutting the spacer, said camming means being inclined surfaces on the ears and the spacer.

7. In combination with an overhead conveyor and a tripping apparatus disposed adjacent the conveyor, a shackle suspended from the conveyor for advancement thereby, said shackle including:
   a pair of elements normally disposed to present a notch therebetween for receiving an appendage of a carcass and holding the latter suspended from the shackle, one of the elements being movable to and from a position releasing the appendage whereby the carcass drops from the shackle in response to its inherent weight; and
   a trip carried by the shackle for up and down movement and normally engaging the movable element for holding the latter against movement to said position, said apparatus including rotatable means operably coupled with said conveyor for rotation by the latter, a swingable lever disposed to engage said trip and lifting the latter to a position releasing the movable element as the shackle is advanced alongside said apparatus by the conveyor, and means operably coupling said lever with said rotatable means for swinging the lever as said rotatable means is rotated.

8. The invention of claim 7, said rotatable means having a camming surface rotatable therewith, said lever having roller means engaging said surface, whereby said lever is caused to swing in response to rotation of said rotatable means.

9. The invention of claim 7, wherein said rotatable means is provided with a plurality of teeth disposed to be successively engaged by said conveyor, whereby said rotatable means is rotated by the conveyor.

10. The invention of claim 9, wherein means, engaging said rotatable means and yieldable to the action of the conveyor on said rotatable means, is provided to retard rotation of said rotatable means.

11. In combination with a conveyor suspending a shackle having a liftable trip provided with a slide, apparatus for actuating said trip including:
   an elongated lifter mounted for up and down swinging movement and disposed for engagement with the slide beneath the latter as the shackle is advanced by the conveyor alongside said lifter,
   mechanism for swinging the lifter whereby the slide is lifted as it slides along the lifter, said lifter having a pivotal support at one end thereof and being disposed on an incline when the opposite end thereof is swung to the uppermost end of its path of swinging movement, said lifter being disposed for sliding movement of the slide from said one end to said opposite end of the lifter; and
   structure coupling said mechanism with the conveyor for actuating of the mechanism by said conveyor.

References Cited by the Examiner

UNITED STATES PATENTS

| 2,810,926 | 10/1957 | Mitchell et al. | 17—11 |
| 3,097,391 | 7/1963 | Wayne | 17—11 |
| 3,124,831 | 3/1964 | Altenpohl | 17—44.1 X |
| 3,132,373 | 5/1964 | Altenpohl | 17—44.1 |
| 3,145,416 | 8/1964 | Smith | 17—44.1 |

SAMUEL KOREN, *Primary Examiner.*

LUCIE H. LAUDENSLAGER, *Examiner.*